US007512690B2

(12) United States Patent
Gross et al.

(10) Patent No.: US 7,512,690 B2
(45) Date of Patent: Mar. 31, 2009

(54) SYSTEM AND METHOD FOR TRANSFERRING DATA BETWEEN DATABASES

(75) Inventors: Jens-Uwe Gross, Walldorf (DE); Kazuya Imabayashi, Tokyo (JP)

(73) Assignee: SAP AG, Walldorf (DE)

( * ) Notice: Subject to any disclaimer, the term of this patent is extended or adjusted under 35 U.S.C. 154(b) by 861 days.

(21) Appl. No.: 10/892,377

(22) Filed: Jul. 16, 2004

(65) Prior Publication Data

US 2005/0050116 A1 Mar. 3, 2005

(30) Foreign Application Priority Data

Jul. 18, 2003 (JP) ............................ 2003-277149

(51) Int. Cl.
*G06F 15/16* (2006.01)
*G06F 7/00* (2006.01)
*G06F 12/00* (2006.01)

(52) U.S. Cl. ....................... 709/227; 709/203; 709/228; 709/229; 707/3; 707/10; 707/200; 707/204

(58) Field of Classification Search ................ 709/203, 709/227, 228, 229; 707/2, 10, 200, 204, 707/3; 705/1, 20, 50, 67, 75
See application file for complete search history.

(56) References Cited

U.S. PATENT DOCUMENTS 5,758,355 A * 5/1998 Buchanan .................. 707/201
5,802,511 A * 9/1998 Kouchi et al. .................. 707/2
6,189,011 B1 * 2/2001 Lim et al. ................... 707/102
6,418,448 B1 * 7/2002 Sarkar ..................... 707/104.1
6,463,418 B1 * 10/2002 Todd .......................... 705/26
6,535,880 B1 * 3/2003 Musgrove et al. ............. 707/10
6,757,710 B2 * 6/2004 Reed .......................... 709/203
7,043,453 B2 * 5/2006 Stefik et al. ................... 705/52
2002/0059299 A1 * 5/2002 Spaey ...................... 707/104.1
2002/0087447 A1 * 7/2002 McDonald et al. ............ 705/36
2002/0199001 A1 * 12/2002 Wenocur et al. ............ 709/227
2003/0200168 A1 * 10/2003 Cullen et al. .................. 705/37
2004/0019494 A1 * 1/2004 Ridgeway et al. .............. 705/1
2004/0073512 A1 * 4/2004 Maung ........................ 705/51
2004/0148229 A1 * 7/2004 Maxwell ...................... 705/26
2005/0004978 A1 * 1/2005 Reed et al. .................. 709/203
2007/0192362 A1 * 8/2007 Caballero et al. ........ 707/104.1

FOREIGN PATENT DOCUMENTS

JP 2002-347907 12/2000

* cited by examiner

*Primary Examiner*—Saleh Najjar
*Assistant Examiner*—Farzana Huq
(74) *Attorney, Agent, or Firm*—Finnegan, Henderson, Farabow, Garrett & Dunner, LLP

(57) ABSTRACT

A data transfer control device issues a session key identifying an application running on a user terminal. Then the device specifies a first database as a transfer destination of data input into a common data field for the first and a second database and outputs the data to an application process together with a session key. The device then inputs the data in the common data field together with the session key from the application process and updates the first database. After that, the device retrieves and outputs the data requested by the application process from the updated first database.

9 Claims, 7 Drawing Sheets

SYSTEM AND METHOD FOR TRANSFERRING DATA BETWEEN DATABASES

TECHNICAL FIELD

The present invention generally relates to transferring data between computer databases having different formats. More particularly, the present invention relates to a system and method that synchronizes input to a plurality of databases that have different field definitions.

RELATED APPLICATIONS

Priority is claimed to Japan Patent Application No. 2003-277149, filed on Jul. 18, 2003, the content of which is incorporated herein by reference.

BACKGROUND

Computer systems often contain data files and relational database systems with different management formats. Conventionally, technology exists for managing the record formats and table definitions using common record format information and for performing migration between data files and relational database systems in a unified manner.

For example, Japanese Unexamined Patent Application, First Publication No. 2000-347907 discloses a data file automatic conversion device that converts a migration source record or table to a migration destination record or table between data files or relational database systems that have different management formats. This device performs data conversion based on common record format information using expressions that unify the data definition information and attribute information that differs for each source program or relational database system. According to this publication, when moving a migration source data file to a migration destination data file, the data conversion process between data files with different management formats can be unified and automated.

On the other hand, in many businesses recently, the use of supplier-relationship management (SRM) to automate business-to-business processes with suppliers relating to the purchase of products or services is being investigated. SRM aims to decrease the high cost of procurement of a product or service. With SRM, by providing a bid management function that allows buyers and suppliers to participate, cost effectively, in an electronic procurement process, for example, it is possible to realize a process with excellent transparency, a reduction in the overall transaction cycle, an improved supplier selection process, a reduced delivery period, and reduced purchasing costs.

In order to realize such required functions, it is desirable to integrate both the buyer site and the seller site in real time and to manage all the processes in the procurement cycle from the purchase request to payment within the same application. It is proposed that a common materials-management interface be provided for the existing back-end system of each user (buyers and suppliers) and be used in conjunction with an Internet-based system.

However, on a client-side user terminal, when posting data that was input according to the table definitions of an existing back-end database system to a different existing back-end database system, a problem occurs if the data type or format differ. In particular, correspondence cannot be maintained between the databases, which results in the session being invalidated, making it impossible to provide a seamless transaction environment.

A data file automatic conversion device as described above is effective in an environment under which the conversion of record formats and table definitions is permitted. But in a case where the existing back-end system of each user uses a WWW server customized individually for that user, a problem exists in that conversion of the record format or table definitions in the database system can render the existing HTML file resources or application resources unusable.

SUMMARY

In one aspect, a data transfer control device consistent with the present invention synchronizes inputs to a first and a second database that have different field definitions and outputs data to an application process running on a user terminal. The data transfer control device includes a session management device that issues a session key identifying the application process, a value transfer destination management device, a database management device, and a data request processing device. The value transfer destination management device specifies the first database as the transfer destination of the data input into a data field in the second database common to the first and second database, and outputs the data to the application process together with the session key. The database management device inputs the data in the common data field received from the application process together with the session key and updates the first database. The data request processing device retrieves and outputs the data requested by the application process from the updated first database. Furthermore, the value transfer destination management device may specify the transfer destination of the input data of the common data field using a URL of the first database and the session key.

Moreover, the session management device, when the session key is issued, inputs identifying information of the user terminal, and the value transfer destination management device retrieves from the first database a business object linked to the identifying information of the user terminal input by the session management device, and a settings form indicating whether or not to display certain fields within the business object, and then specifies the transfer destination and outputs together with the session key.

Furthermore, the database management device, when updating the first database, may specify a business object into which to input the data from the common data field, based on the session key input by the application process.

In another aspect, a data transfer control method consistent with principles of the present invention synchronizes inputs to a first and a second database which have different field definitions and outputs to an application process running on a user terminal. The method issues a session key which identifies the application process; specifies the first database as the transfer destination for data input into a data field in the second database which is common to the first and second databases; and outputs together with the session key to the application process; and inputs the data of the common data field from the application process together with the session key to update the first database; and retrieves and outputs the data requested by the application process from the updated first database. Furthermore, the transfer destination of the input data to the common data field may be specified using a URL of the first database and the session key.

Moreover, when the session key is issued, the method inputs identifying information for the user terminal, retrieves from the first database a business object linked to the identifying information of the user terminal and a settings form indicating whether to display or not display certain fields within the business object, and then specifies the transfer destination, and outputs together with the session key. Furthermore, when the first database is updated, the method may specify a business object into which to input the data from the common data field, based on the session key input from the application process.

Moreover, in another aspect, a computer-readable medium consistent with the principles of the present invention stores instructions for synchronizing inputs to a first and a second database which have different field definitions and outputting to an application process running on a user terminal. When executed, the instructions perform stages including issuing a session key identifying the application process; specifying the first database as the transfer destination of the data input into a data field in the second database which is common to the first and second databases and outputting together with the session key to the application process; inputting the data in the common data field received from the application process together with the session key and updating the first database; and retrieving and outputting the data requested by the application process from the updated first database. Furthermore, the transfer destination for the input data to the common data field is specified using a URL of the first database and the session key.

Moreover, the performed stages may include, when the session key is issued, inputting identifying information for the user terminal; and retrieving from the first database a business object linked to the identifying information of the user terminal, and a settings form indicating whether to display or not display certain fields within the business object, and then specifying the transfer destination, and outputting together with the session key. Furthermore, the performed stages may include, when the first database is updated, specifying a business object into which to input the data from the common data field, based on the session key input from the application process.

As explained above, because the apparatus issues a session key identifying an application running on a user terminal, specifies the first database as the transfer destination of the data input into a common data field for the first and second database and outputs to the application process together with the session key, inputs the data in the common data field together with the session key from the application process and updates the first database, and retrieves and outputs the data requested by the application process from the updated first database, it is possible to obtain an effect of providing a seamless Internet transaction environment between database systems with different field definitions.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings show features of implementations consistent with the present invention and, together with the corresponding written description, help explain principles associated with the invention. In the drawings.

DETAILED DESCRIPTION

The following description refers to the accompanying drawings in which, in the absence of a contrary representation, the same numbers in different drawings represent similar elements. The implementations in the following description do not represent all implementations consistent with principles of the claimed invention. Instead, they are merely some examples of systems and methods consistent with those principles. It is to be understood that both the foregoing general description and the following detailed description are exemplary and explanatory only and are not restrictive of the invention, as claimed.

Figure 1:
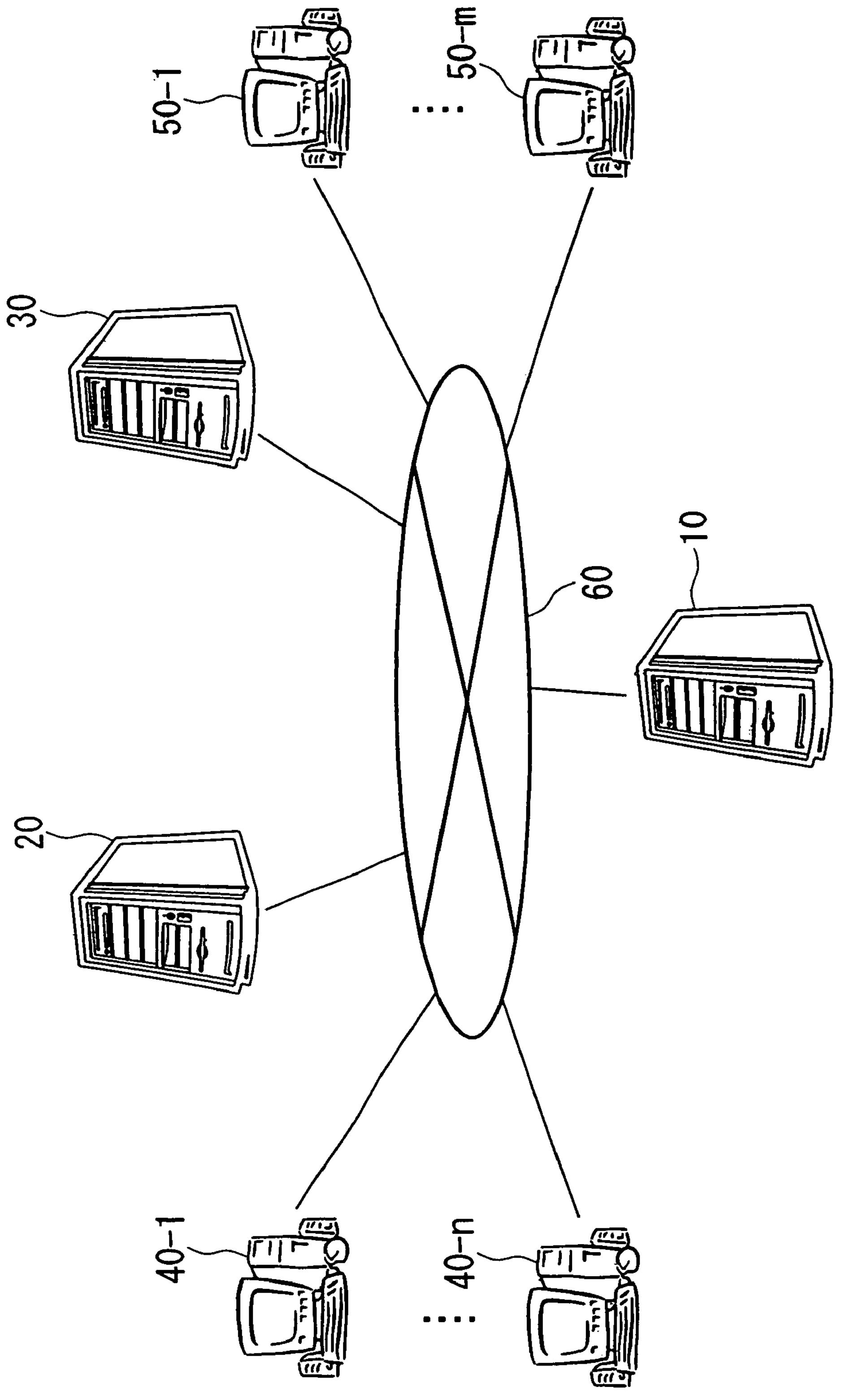
FIG. 1 is an overall block diagram showing a bid management system 1.

FIG. 1 is a block diagram showing the overall structure of a bid management system 1 using a data transfer control device of the present embodiment (referred to below as SRM 10: Supplier Relation Management server system 10). The bid management system 1 of the present embodiment is constructed by connecting an SRM 10, a request for quotation (RFQ) issuance management server system (RFQG) 20, a price management server system (PMS) 30, and a plurality of user terminals 40-1 to n (purchaser-side client terminals) and 50-1 to m (supplier-side client terminals), via the Internet 60.

Figure 2:
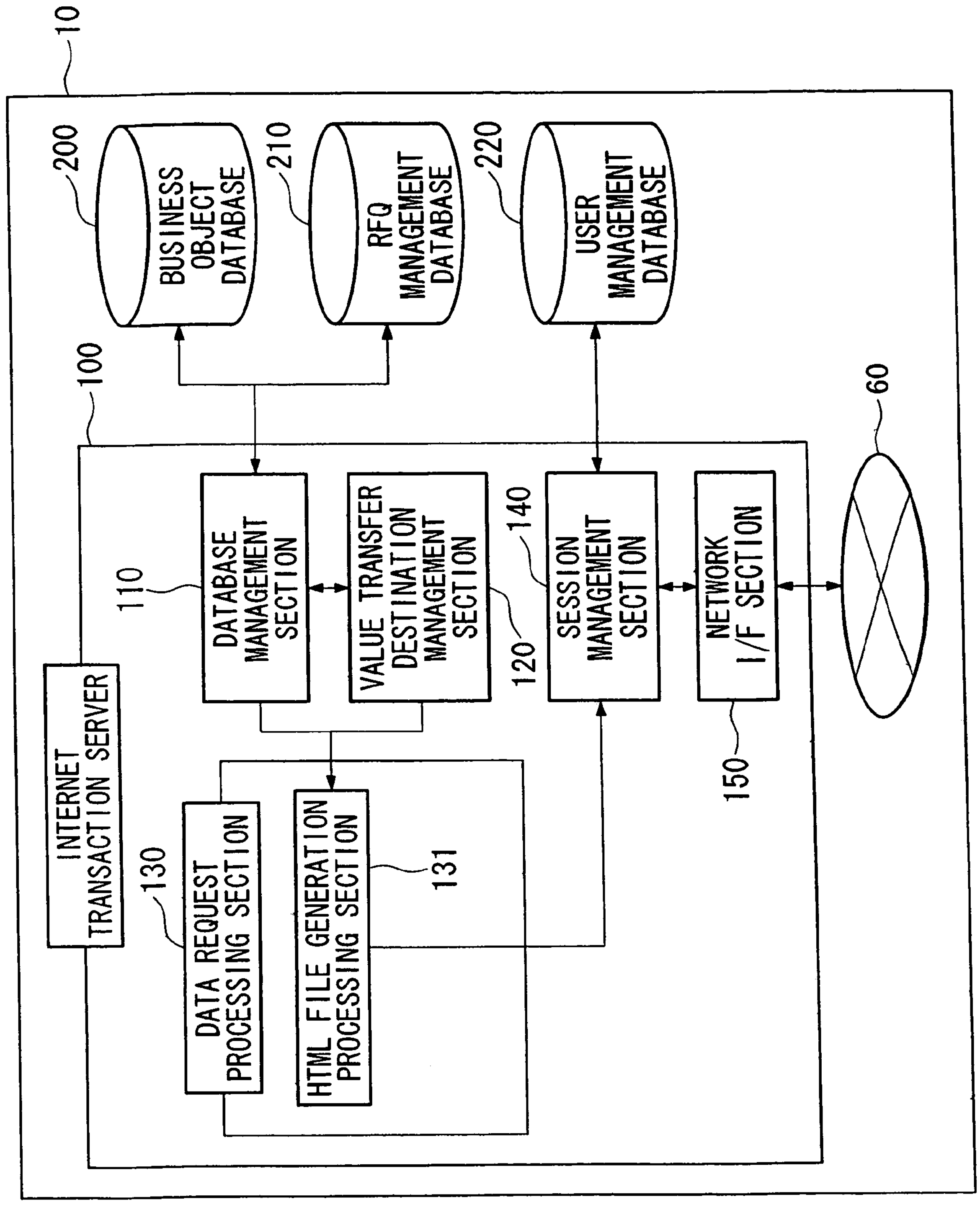
FIG. 2 is a block diagram showing an SRM 10.

The following is a description of the construction of the SRM 10, using FIG. 2. The SRM 10 comprises an Internet transaction server (ITS) 100, a business object database (DB) 200, an RFQ management DB 210, and a user information DB 220.

The ITS 100 is a WWW server that emulates (pseudo-synchronizes) and displays data input/output to a plurality of databases with different field definitions (specifically the business object DB 200 managed by the SRM 10 and a price DB 300 managed by the PMS 30) on an application process (the description below uses the example of a WWW browser application) running on the user terminals 40-1 to n and 50-1 to m. In the present embodiment, this ITS 100 realizes a bid management environment that integrates in real-time both the purchaser site and the seller site, and manages all processes in the procurement cycle from the purchase request to payment within the same application. The ITS 100 comprises specifically a database management section 110, a value transfer destination management section 120, a data request processing section 130, a session management section 140, and a network interface (I/F) section 150.

The session management section 140 is a session management process for a WWW browser application process on the user terminals 40 and 50 (used below as representative examples of the purchaser-side and supplier-side user terminals) accessing the ITS 100. Specifically, for each bid transaction, the session management section 140 issues a session key for identifying a transaction with the WWW browser application process, and creates and manages session tables linked to identification information (for example a user ID) acquired, for example, when the user terminals 40 and 50 log in to the ITS 100.

The database management section 110 is a data input/output management process between the ITS 100, and the business object DB 200, the RFQ management DB 210 and the user information DB 220. Specifically, the database management section 110 receives input, from the WWW browser application process on the user terminals 40 and 50, of data from a data field common to the business object DB 200 and the price DB 300 together with the session key issued by the session management section 140, and updates the business object DB 200. When the business object DB 200 is updated, the database management section 110 specifies the business object into which to input the data from the common data field, based on the session key input from the WWW browser application process on the user terminals 40 and 50.

The business object DB 200 stores a plurality of business objects. A business object is defined as an encapsulation of properties and business methods relating to bid transaction processing, and in the present embodiment, a business object stores the RFQ which makes up each transaction, and the bid information (BIT) received in reply to bid invitations based on that RFQ, and the like.

The RFQ management DB 210 stores RFQs issued by the RFQG 20 based on the request for quotation information (such as purchaser ID, ID of suppliers with permission to bid, bidding time, parts information) input from the user terminals (purchasers) 40-1 to n.

An RFQ comprises such information as the purchaser ID, bidding time, and parts information obtained from the request for quotation information, and may additionally comprise request for quotation information such as the country ID and time zone ID of the seller and purchaser, provisional bid time limit, and principal bid time limit, as needed.

The user information DB 220 stores user information such as user IDs, user names, addresses, country IDs and time zone IDs.

The value transfer destination management section 120 is a process that specifies the data transfer destination for the WWW browser application process on the user terminals 40 and 50. Specifically, the value transfer destination management section 120 specifies the ITS 100 or the business object DB 200 as the transfer destination for the data which, of the data input into the price DB 300 via the WWW browser application process on the user terminals 40 and 50, is input into data fields common to the business object DB 200 and the price DB 300, and outputs the data together with the session key.

Furthermore, the value transfer destination management section 120 retrieves from the business object DB 200 a business object linked to the identification information of the user terminals 40 and 50 input by the session management section 140 and a settings form indicating whether or not to display certain fields within the business object. Value transfer destination management section 120 also specifies the transfer destination and outputs the business object and settings form together with the session key. The transfer destination for this data input into the common data fields is specified by combining the URL of the ITS 100 or the business object DB 200, with the session key.

The data request processing section 130 processes data requests made to the business object DB 200 and the RFQ management DB 210, comprising an HTML file generation section 131. In other words, the data request processing section 130 retrieves data requested by the WWW browser application process on the user terminals 40 and 50 from the business object DB 200 and the RFQ management DB 210, generates an HTML file, and outputs (publishes) the file to the user terminals 40 and 50.

The network I/F section 150 is an interface that connects the Internet 60 and the SRM 10.

In the price DB 300, the PMS 30 manages detailed breakdown information for the bid information input from the parts supplier-side user terminals 50-1 to m. In other words, the bid information shown by the business objects stored in the business object DB 200 managed by the SRM 10 is an index of the price DB 300 managed by the PMS 30, and the related master data is stored in the price DB 300.

In the present embodiment, the business object DB 200 and the price DB 300 are constructed as different database systems. Specifically, each database system has unique table definitions and has a different data type and format (specifically the number of fields). Consequently, the data type of the input fields and the number of input fields as defined in the HTML file generated on the SRM 10 side, correspond in parts to the data type of the input fields and number of input fields as defined in the HTML file generated on the PMS 30 side, and also differ in parts.

Figure 3:
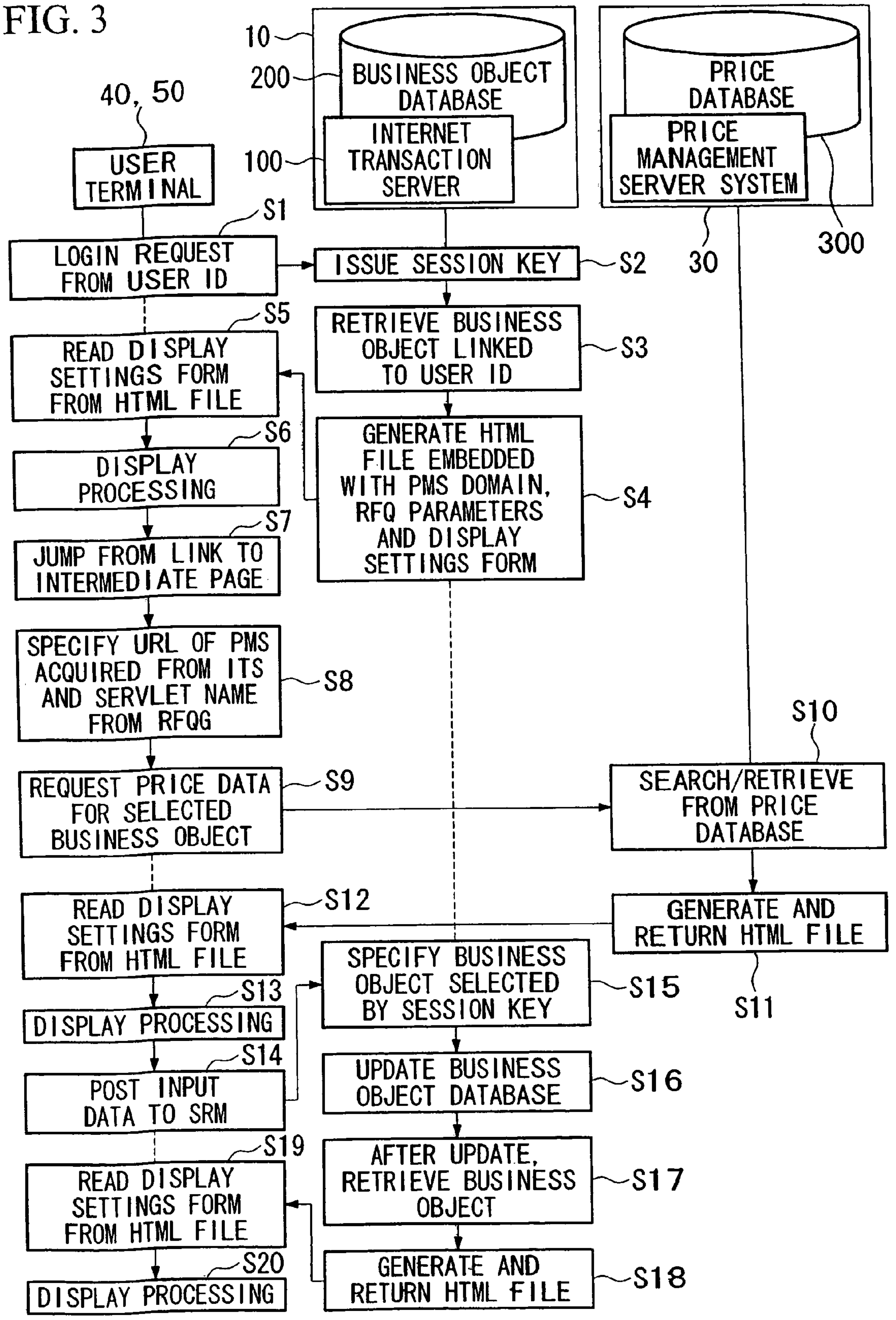
FIG. 3 is a flowchart showing data transfer control.

Next, a bid management system 1 of the present embodiment is described with reference to the drawings. FIG. 3 is a flow chart showing the steps involved in a data transfer control process in the bid management system 1 of the present embodiment.

Based on the request for quotation information registered from the user terminal 40, the RFQG 20 issues an RFQ in accordance with the RFQ format defined in the SRM 10. After the RFQ is registered in the SRM 10, the SRM 10 notifies the PMS 30 indicated in the RFQ of the bid invitation ID and the IDs of the user terminals 50 of suppliers permitted to bid as indicated in the RFQ. Then, SRM 10 outputs the bid invitation to the user terminals 50 of suppliers permitted to bid as indicated in the RFQ, in the form of an e-mail or the like. At the user terminal 50, the supplier checks the bid invitation, and accesses the SRM 10 in order to input bid information.

In other words, the WWW browser application process on the user terminal 50 receives input of the user (supplier) ID and password issued in advance by the SRM 10, and performs a login request (step S1 in FIG. 3).

In the SRM 10, after password verification is performed, the session management section 140 in the ITS 100 issues a session key for the WWW browser application process (step S2), generates a new session object, and writes the correspondence between the session key and the session object to a session table. Data generated by subsequent transactions is stored within the temporarily generated session object.

Next, the ITS 100 retrieves a business object linked to the user ID, comprising an RFQ and a bid information input form (RFQ parameters), from the business object DB 200 (step S3). The ITS 100 then creates an HTML file embedded with the host domain of the PMS 30, the RFQ parameters and the display settings (step S4), and outputs the file to the user terminal 50.

Transfer of the session key to the WWW browser application process on the user terminal 50 is performed by constructing a URL with the session key appended to the host domain of the PMS 30.

Furthermore, how the host domain of the PMS 30 is specified depends on the specific implementation, but if there is only one PMS 30, it can be specified as the default, and if there are a plurality of PMS 30, then a domain linked to the retrieved RFQ can be specified.

In the user terminal 50, the WWW browser application process reads the HTML file input from the ITS 100 (step S5), and performs display processing according to the display settings form, displaying or not displaying and allowing input or not allowing input for each input field indicated by the RFQ parameters (step S6).

Furthermore, at this time, the link action to the URL combining the host domain of the PMS 30 and the session key is set to a predetermined display object (for example a link button).

Figure 4:
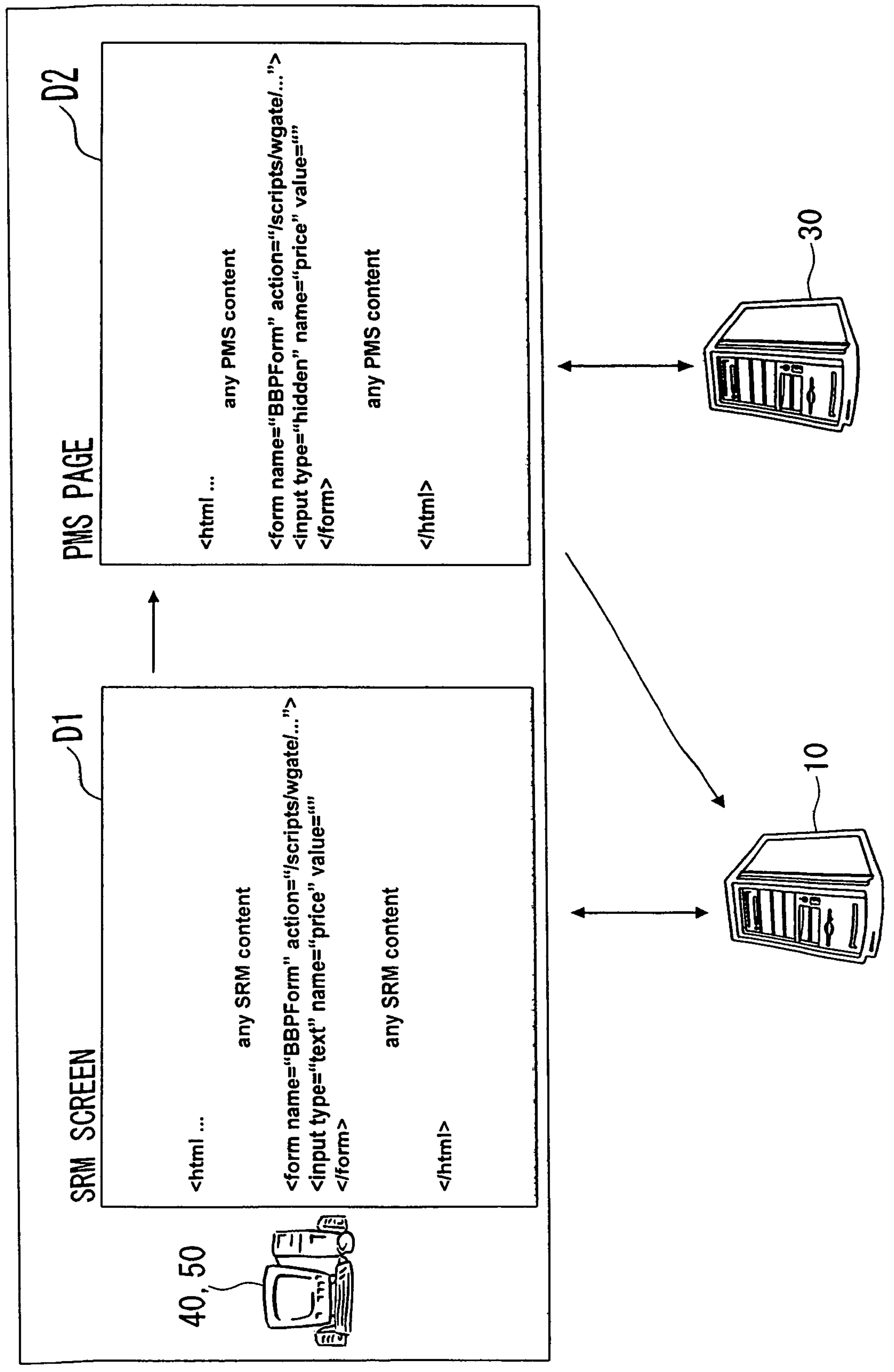
FIG. 4 is an example of HTML code.
Figure 5:
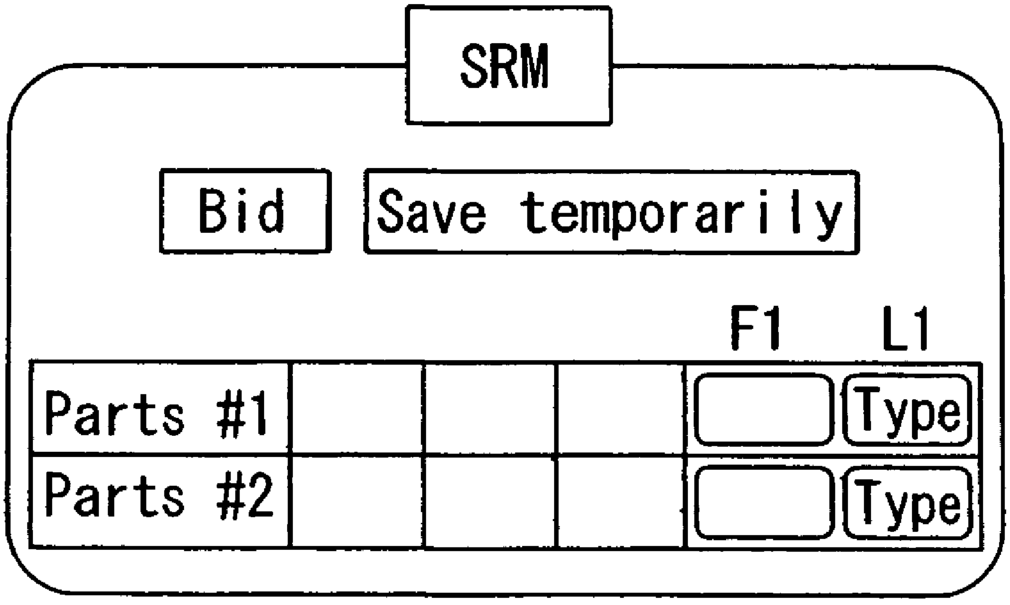
FIG. 5 is an example of a display screen on a user terminal.

FIG. 4 and FIG. 5 show, in the user terminal 50, an example of the read HTML code, and the results of the display processing, respectively.

As a result of embedding the RFQ parameters and the display settings form as shown in the SRM screen D1 in FIG. 4, an input field F1 and a link button L1 is displayed for each parts number 1 and 2 at the user terminal 50 as shown in FIG. 5.

At the user terminal 50, if the trigger event (for example a mouse click) set for the link button L1 is activated in a state where data is input in the input field F1, the WWW browser application process performs value transfer to the PMS 30 using HTTP Post.

In other words, the WWW browser application process first follows the link, jumping to an intermediate page generated by the ITS 100 (step S7).

At this time, the WWW browser application process specifies the URL combining the host domain of the PMS 30 and the session key, acquired from the parameters of the ITS 100, and name of a servlet to run on the PMS 30, acquired from the parameters of the RFQG 20 (step S8), and outputs the input data.

As a result, a request for price data is output to the PMS 30, using the selected business object (for example parts #1) as a key (step S9).

Upon receiving input of the price data request, the PMS 30 starts the specified servlet, searches the price DB 300 using the selected business object as the key, retrieves any price data found by the search (step S10), and generates and returns an HTML file according to the unique table definitions (step S11). At this time, in the generated HTML file, the link action to the URL combining the host domain of the SRM 10 and the session key is set to a predetermined display object (for example a link button).

In the user terminal 50, the WWW browser application process reads the HTML file input from the PMS 30 (step S12), and performs display processing according to the display settings form, displaying or not displaying and allowing input or not allowing input for each input field indicated by the RFQ parameters.

Figure 6:
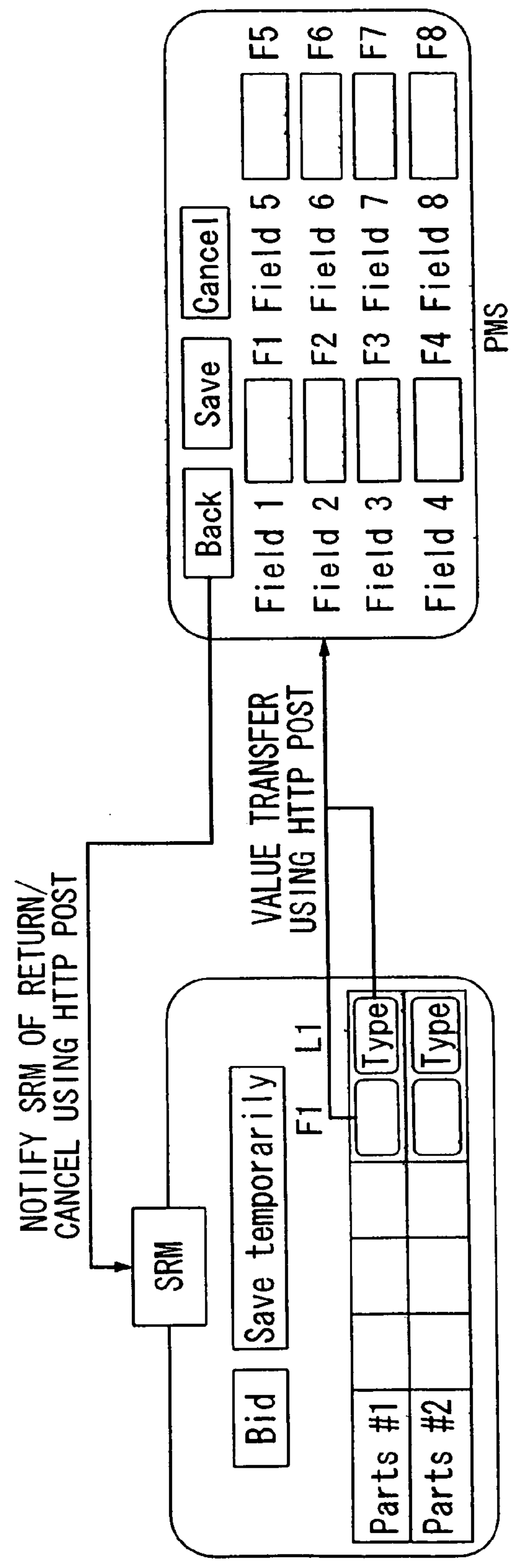
FIG. 6 is an example of display screen transitions in write mode.

FIG. 6 shows an example of the results of display processing in the user terminal 50. As a result of embedding the RFQ parameters and the display settings form as shown in the PMS page D2 in FIG. 4, input fields F1 through F8 and a link button B1 are displayed for the selected parts #1 at the user terminal 50 as shown in FIG. 6.

At the user terminal 50, if the trigger event (for example a mouse click) set for the link button B1 is activated in a state where data is input in the input fields F1 through F8, the WWW browser application process performs value transfer to the SRM 10 using HTTP Post.

In other words, in the same manner as in step S7, the WWW browser application process first follows the link, jumping to an intermediate page generated by the ITS 100.

At this time, the WWW browser application process specifies the URL combining the host domain of the ITS 100 and the session key, acquired from the parameters of the ITS 100, and outputs the data which, of the data input into the data fields F1 through F8 in the price DB 300, is input into data fields that are common to the business object DB 200 and the price DB 300 (for example input field F1).

Consequently, value transfer of the data input into the data field F1, which, of the price data input fields that have the selected business object (for example parts #1) as a key, is common to the business object DB 200 and the price DB 300, is performed to the SRM 10 using HTTP Post (step S14).

In the SRM 10, the ITS 100 inputs the data of the data field common to the business object DB 200 and the price DB 300, together with the session key, from the WWW browser application process.

Based on the input session key, the ITS 100 first specifies the business object in the business object DB 200 into which to input the data of the common data field (step S15). Then after checking the data type and the like of the common data field, the business object DB 200 is updated with the input data from the WWW browser application process (step S16). After the business object DB 200 is updated, the ITS 100 retrieves a business object linked to the user ID, comprising an RFQ and a bid information input form (RFQ parameters), from the updated business object DB 200 (step S17).

The ITS 100 then creates an HTML file embedded with the host domain of the PMS 30, the RFQ parameters and the display settings. (step S18), and outputs the file to the user terminal 50.

In the user terminal 50, the WWW browser application process reads the HTML file input from the ITS 100 (step S19), and performs display processing according to the display settings form, displaying or not displaying and allowing input or not allowing input for each input field indicated by the RFQ parameters (step S20). Furthermore, at this time, the link action to the URL combining the host domain of the PMS 30 and the session key is set to a predetermined display object (for example a link button).

The SRM 10 then executes the above data transfer control processing repeatedly until each transaction is committed. Also, once input of the bid information is confirmed, the SRM 10 sends a bid information confirmation by e-mail or the like to the user terminal 40 which registered the request for quotation. Furthermore, the ITS 100 releases the session objects generated in correspondence with the transactions.

As described above, according to the bid management system 1 using the data transfer control device of the present embodiment, it is possible to prevent a problem from occurring when posting data input at the client-side user terminal according to the table definitions of the existing back-end database system to another existing back-end database system, namely that because the data type and format and the like differ, correspondence cannot be maintained between the databases, and the session is invalidated. Therefore, an effect is obtained whereby it is possible to provide a seamless Internet transaction environment between database systems that have different field definitions. Specifically, an effect is obtained whereby it is possible to provide, in the client-side application process, a closed transaction environment within a single frame.

Furthermore, according to the bid management system 1 using the data transfer control device of the present embodiment, because no conversion of the record format or table definitions is involved, an effect is obtained whereby, even if the existing back-end system of each user has an individually customized WWW server, the problem of the conversion of record formats or table definitions rendering existing HTML file resources or application resources unusable can be avoided.

In the data transfer control device of the present embodiment, there are no particular restrictions regarding the settings in the display settings form indicating for each data field whether to display or not display and to allow input or not allow input for the data field. But the present invention is not limited to this, and instead it is possible to change the HTTP file generated by the PMS 30 based on the display settings form (display/do not display, allow input/do not allow input).

Figure 7:
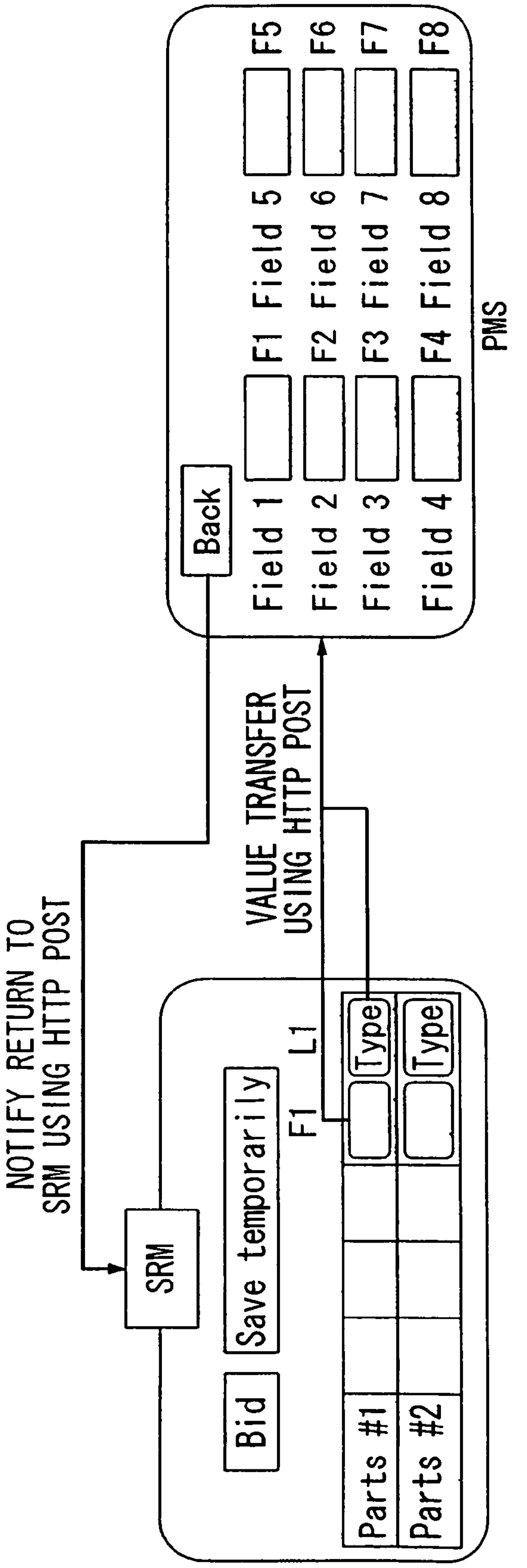
FIG. 7 is an example of display screen transitions in read mode.

The display processing results based on the display settings form shown in FIG. 6 and FIG. 7 show a state where input is allowed and a state where input is not allowed (read mode/write mode), respectively.

As shown in the PMS page D2 in FIG. 4, as a result of embedding the RFQ parameters and the display settings form, when in write mode, each of the input fields F1 through F8 and the link button B1 for the selected parts #1 are displayed on the user terminal 50, as shown in FIG. 6.

On the other hand, when in read mode, input is forbidden to the input fields F1 through F8 for the selected parts #1, and the temporarily saved results input in write mode, or the input confirmation results are displayed on the user terminal 50, as shown in FIG. 7. Furthermore, at the user terminal 50, if the trigger event (for example a mouse click) set for the link button B1 is activated, the WWW browser application process performs value transfer to the SRM 10 using HTTP Post. In other words, in the same manner as in step S14, first the WWW browser application process follows the link, jumping to an intermediate page generated by the ITS 100. By specifying the URL acquired from the ITS 100 parameters combining the host domain of the ITS 100 and the session key, value transfer can be performed to the SRM 10 using HTTP Post.

Consequently, according to the data transfer control device of the present embodiment, an effect is obtained whereby when inputting bid information, and also when temporarily saving bid information, the problem of the conversion of record formats or table definitions rendering existing HTML file resources or application resources unusable can be avoided. This result occurs because no conversion of the record format or table definitions is involved, even if the existing back-end system of each user has a uniquely customized WWW server.

The aforementioned SRM 10, RFQG 20, PMS 30 and user terminals 40 and 50 have internal computer systems.

The steps involved in the series of processes relating to the data transfer control processing mentioned above are stored on a computer-readable medium in program format, and the processes are performed by a computer reading and executing this program.

In other words, each processing device and processing section in the SRM 10, the RFQG 20, the PMS 30 and the user terminals 40 and 50 is realized by a central processing unit such as a CPU reading the above program into main memory such as ROM or RAM, and executing processing and arithmetic processing on the information.

Here a computer readable storage medium refers to magnetic disks, magneto-optical disks, CD-ROMs, DVD-ROMs, semiconductor memory, and the like. Furthermore, it is also possible to deliver the computer program to a computer via a communication line, and have the computer which receives the delivery then execute the program.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A data transfer control device for synchronizing inputs to a first and a second database having different field definitions and outputs to an application process running on a user terminal, comprising:

a session management device configured to issue a session key identifying said application process;

a value transfer destination management device configured to specify at least one receipt data field in said first database as transfer destination for data input into at least one transfer data field in said second database, wherein the at least one transfer data field to be transferred is common to the first and second databases and has a different field definition than the at least one receipt data field in said first database the specified transfer destination to said application process together with said session key;

a database management device configured to input the data input into the at least one transfer data field in said second database that is common to the first and second databases, wherein the data input is received from said application process together with said session key and updating said first database with the at least one receipt data field that is common to the first and second databases based on the specified transfer destination and based on the session key;

and a data requested processing device configured to retrieve and output the data requested by said application process from said updated first database;

wherein said session management device, when said session key is issued, inputs identifying information of said user terminal, and said value transfer destination management device retrieves from said first database a business object linked to the identifying information of the user terminal input by said session management device and a settings form indicating whether or not to display certain fields within said business object, and then specifies said transfer destination and outputs the business object and settings form together with said session key.

2. The data transfer control device according to claim 1, wherein said value transfer destination management device specifies the transfer destination of the input data of the common data field using a URL of said first database and said session key.

3. The data transfer control device according to claim 1, wherein said database management device, when updating said first database, specifies a business object into which to input the data from said common data field, based on the session key input by said application process.

4. A data transfer control method for synchronizing inputs to a first and a second database having different field definitions and outputs to an application process running on a user terminal, comprising:

issuing a session key identifying said application process;

specifying at least on receipt data field in said first database as transfer destination for data input into at least transfer one field in said second database, wherein the at least one transfer data field to be transferred is common to said first and second databases and has a different field definition than the at least one receipt data field in said first database and outputting the specified transfer destination together with said session key to said application process;

inputting the data of said at least one transfer data field in said second database that is common to the first and second databases from said application process together with said session key to update said first database with the at least one receipt data field that is common to the first and second databases based on the specified transfer destination and based on the session key; and retrieving and outputting the data requested by said application process from said updated first database;

when said session key is issued, inputting identifying information for said user terminal, retrieving from said first database a business object linked to the identifying information of said user terminal and a settings form indicating whether to display or not display certain fields within said business object, specifying said transfer destination, and outputting the business object and settings form together with said session key.

5. The data transfer control method according to claim 4, wherein the transfer destination of the input data to said common data field is specified using a URL of said first database and said session key.

6. The data transfer control method according to claim 4, further comprising, when said first database is updated, specifying a business object into which to input the data from said common data field, based on the session key input from said application process.

7. A computer-readable medium on which is stored a set of instructions for synchronizing inputs to a first and a second database having different field definitions and outputting to an application process running on a user terminal, which instructions when executed perform stages comprising:

issuing a session key identifying said application process;

specifying at least one receipt data field in said first database as transfer destination for data input into at least one transfer field in said second database, wherein the at least one transfer data field to be transferred is common to said first and second databases and has a different field definition than the at least on receipt data field in said first database and outputting the specified transfer destination together with said session key to said application process;

inputting the data of said at least one transfer data field in said second database that is common to the first and second databases from said application process together with said session key to update said first database with the at least one receipt data field that is common to the first and second databases based on the specified transfer destination and based on the session key; and retrieving and outputting the data requested by said application process from said updated first database;

wherein the performed stages further comprise: when said session key is issued, inputting identifying information for said user terminal; and retrieving from said first database a business object linked to the identifying information of said user terminal and a settings form indicating whether to display or not display certain fields within said business object, and then specifying said transfer destination, and outputting the business object and settings form together with said session key.

8. The computer-readable medium according to claim 7, wherein the transfer destination for the input data to said common data field is specified using a URL of said first database and said session key.

9. The computer-readable medium according to claim 7, wherein the performed stages further comprise, when said first database is updated, specifying a business object into which to input the data from said common data field, based on the session key input from said application process.

* * * * *